(12) United States Patent
Alwan et al.

(10) Patent No.: US 11,505,259 B2
(45) Date of Patent: Nov. 22, 2022

(54) CANOPY WINDSHIELD RETENTION

(71) Applicant: Ford Global Technologies, LLC, Dearborn, MI (US)

(72) Inventors: Jamil M. Alwan, Ann Arbor, MI (US); Chunhui Kevin Lee, Troy, MI (US); Thiag Subbian, Farmington Hills, MI (US); Djamal Eddine Midoun, Ann Arbor, MI (US); Suraj Jadhav, Farmington Hills, MI (US); Petros Frantzeskakis, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/731,751

(22) Filed: Apr. 28, 2022

(65) Prior Publication Data
US 2022/0250688 A1 Aug. 11, 2022

Related U.S. Application Data

(62) Division of application No. 17/127,748, filed on Dec. 18, 2020, now Pat. No. 11,345,409.

(51) Int. Cl.
| | |
|---|---|
| *B62D 25/08* | (2006.01) |
| *B62D 25/02* | (2006.01) |
| *B62D 25/04* | (2006.01) |
| *B60R 11/00* | (2006.01) |
| *B60J 1/02* | (2006.01) |
| *B60R 13/02* | (2006.01) |

(52) U.S. Cl.
CPC ............. *B62D 25/08* (2013.01); *B62D 25/02* (2013.01); *B60J 1/02* (2013.01); *B60R 13/025* (2013.01); *B60R 2011/0022* (2013.01); *B62D 25/04* (2013.01)

(58) Field of Classification Search
CPC ...... B62D 25/04; B62D 25/08; B62D 21/152; B62D 31/02; B62D 23/00; B60J 1/02
USPC .. 296/203.01–203.3, 193.05–193.06, 193.09
See application file for complete search history.

(56) References Cited

U.S. PATENT DOCUMENTS

| | | | | |
|---|---|---|---|---|
| 4,274,190 | A | * | 6/1981 | Slattery ................. B62D 31/02 29/401.1 |
| 6,769,730 | B2 | | 8/2004 | Okamoto et al. |
| 6,779,835 | B2 | | 8/2004 | Fox et al. |
| 7,083,223 | B2 | * | 8/2006 | Forsman ................ B62D 25/02 296/187.09 |

(Continued)

FOREIGN PATENT DOCUMENTS

| | | |
|---|---|---|
| CN | 204726347 U | 10/2015 |
| EP | 1997721 A1 * | 12/2008 ............. B62D 21/15 |

(Continued)

*Primary Examiner* — Dennis H Redder
(74) *Attorney, Agent, or Firm* — Vichit Chea; Price Heneveld LLP

(57) ABSTRACT

The present disclosure relates to a vehicle that includes a windshield and a frame. In addition, the vehicle includes a first pillar that extends from one side of the windshield. The first pillar includes a first wall and a second wall coupled to the first wall. The first pillar also includes a first portion and a second portion. The first portion includes a first interior support coupled to the first wall and a second interior support coupled to the second wall. Further, the first interior support includes a first end which is spaced from a second end in the second portion.

7 Claims, 9 Drawing Sheets

(56) References Cited

U.S. PATENT DOCUMENTS

| | | | |
|---|---|---|---|
| 8,109,532 B2 * | 2/2012 | Schirm | B60R 21/213 296/193.06 |
| 8,201,872 B2 | 6/2012 | Baccouche et al. | |
| 9,815,498 B2 | 11/2017 | Yamamoto et al. | |
| 2005/0218698 A1 | 10/2005 | Forsman | |
| 2020/0086924 A1 | 3/2020 | Stibich et al. | |

FOREIGN PATENT DOCUMENTS

| | | | |
|---|---|---|---|
| EP | 2138382 A1 * | 12/2009 | B62D 25/04 |
| JP | 3789191 B2 | 6/2006 | |

* cited by examiner

CANOPY WINDSHIELD RETENTION

CROSS-REFERENCE TO RELATED APPLICATION

This application is a divisional of U.S. patent application Ser. No. 17/127,748 filed Dec. 18, 2020, entitled "CANOPY WINDSHIELD RETENTION." The aforementioned related application is hereby incorporated by reference.

FIELD OF THE DISCLOSURE

The present disclosure is directed to a canopy windshield retention structure.

BACKGROUND OF THE DISCLOSURE

Mass transport vehicles, such as vans and buses, are designed to ferry a large number of people. Recently, new kinds of mass transport vehicles, such as electric pod taxis, provide a larger volume in a cabin compartment. The larger volume for the cabin compartment is achieved by pushing the upper body architecture boundary in both forward and rearward directions. Such configurations vehicles have smaller front end crumple zones or crash zones. For instance, the distance between a front fascia of the vehicle and the cabin compartment may be reduced.

SUMMARY OF THE DISCLOSURE

The present disclosure relates to a canopy style vehicle having a windshield bounded by vehicle pillars that are configured to crumple or crush in a controlled manner in the event of a crash. The vehicle includes a relatively small distance between a front bumper or fascia and an occupant chamber or cabin.

The vehicle includes a frame with a first pillar and a second pillar that extends along the sides of the windshield. The first and second pillars include a portion that is configured to crumple or crush that rotates the windshield downward in a controlled manner. The pillars include a first interior wall opposite and coupled to a second exterior wall. The pillars also include a first interior support structure that is within the first and second walls. The interior support structure includes a third interior wall adjacent to the first interior wall and a fourth exterior wall that is adjacent to the second exterior wall. At the portions configured to crumple, the interior support only includes one of the third interior wall or the fourth exterior wall.

The third interior wall is coupled to the first wall and the fourth exterior wall is coupled to the second wall. The first interior support includes a first end which is spaced from a second end in the second portion, i.e. there is a gap in the first interior support in the portion of the pillar that is configured to react in the event of a collision.

In some embodiments, the vehicle includes a canopy windshield and a roof coupled to the canopy windshield. The pillar along the windshield includes a first stiffness zone and a second stiffness zone, such that the second stiffness zone is closer to the roof than the first stiffness zone.

In some embodiments, the vehicle includes a windshield retention beam that is coupled to a body or the frame by a first side beam and a second side beam. The first side beam includes a first portion coupled to the windshield retention beam. The first side beam also includes a second portion and a third portion, such that the third portion is attached to the body and the second portion is between the first portion and the third portion. The third portion, which is positioned between a side window and the ground, includes openings to provide a controlled crush to allow the bottom of the windshield to rotate downward and toward a steering column.

The first portion and the second portion provide different a stiffness as compared to the third portion. The differences in stiffness mitigate an impact received during a crash.

These and other features, advantages, and objects of the present invention will be further understood and appreciated by those skilled in the art by reference to the following specification, claims, and appended drawings.

DETAILED DESCRIPTION OF PREFERRED EMBODIMENTS

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures or methods associated with vehicles have not been shown or described in detail to avoid unnecessarily obscuring descriptions of the embodiments.

Figure 1A:
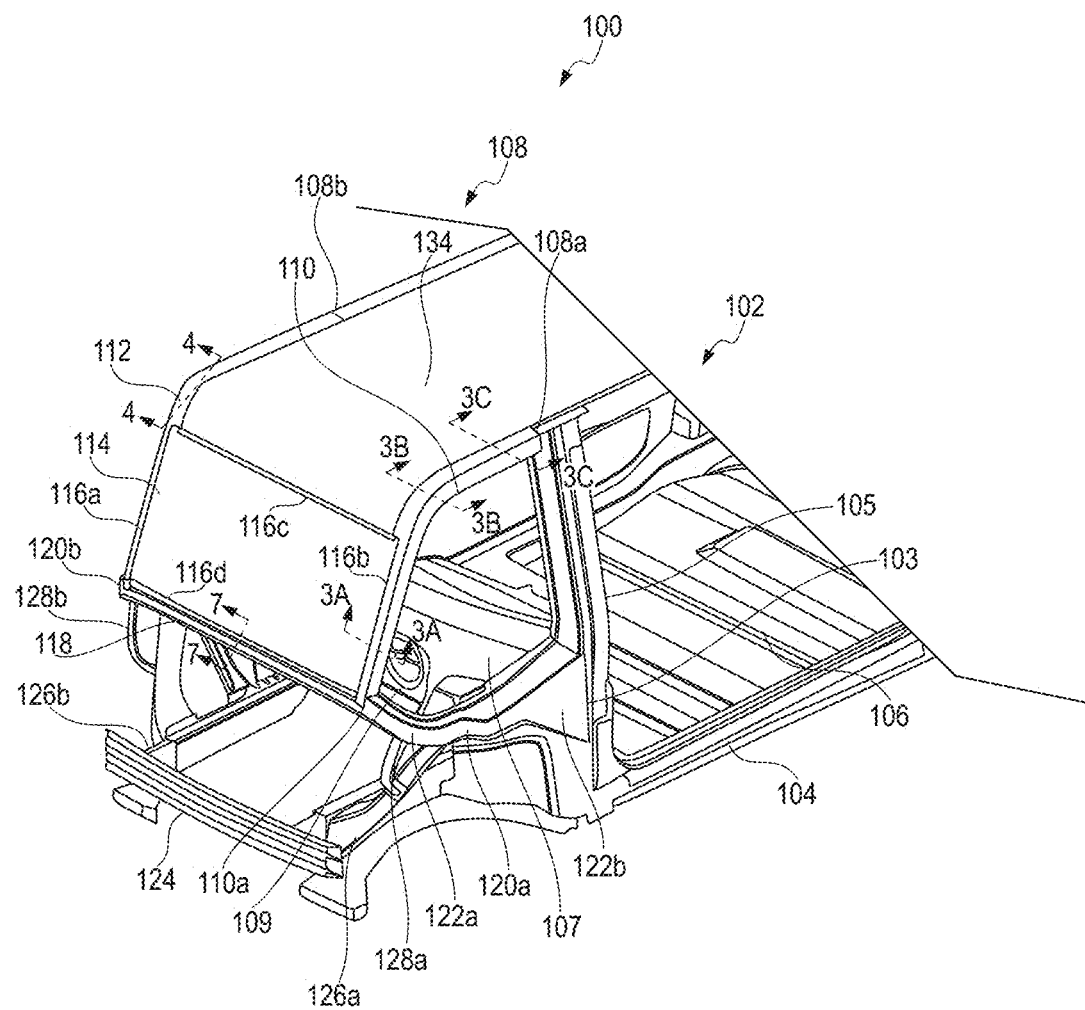
FIG. 1A is a front perspective view of a vehicle according to an embodiment of the present disclosure.
Figure 1B:
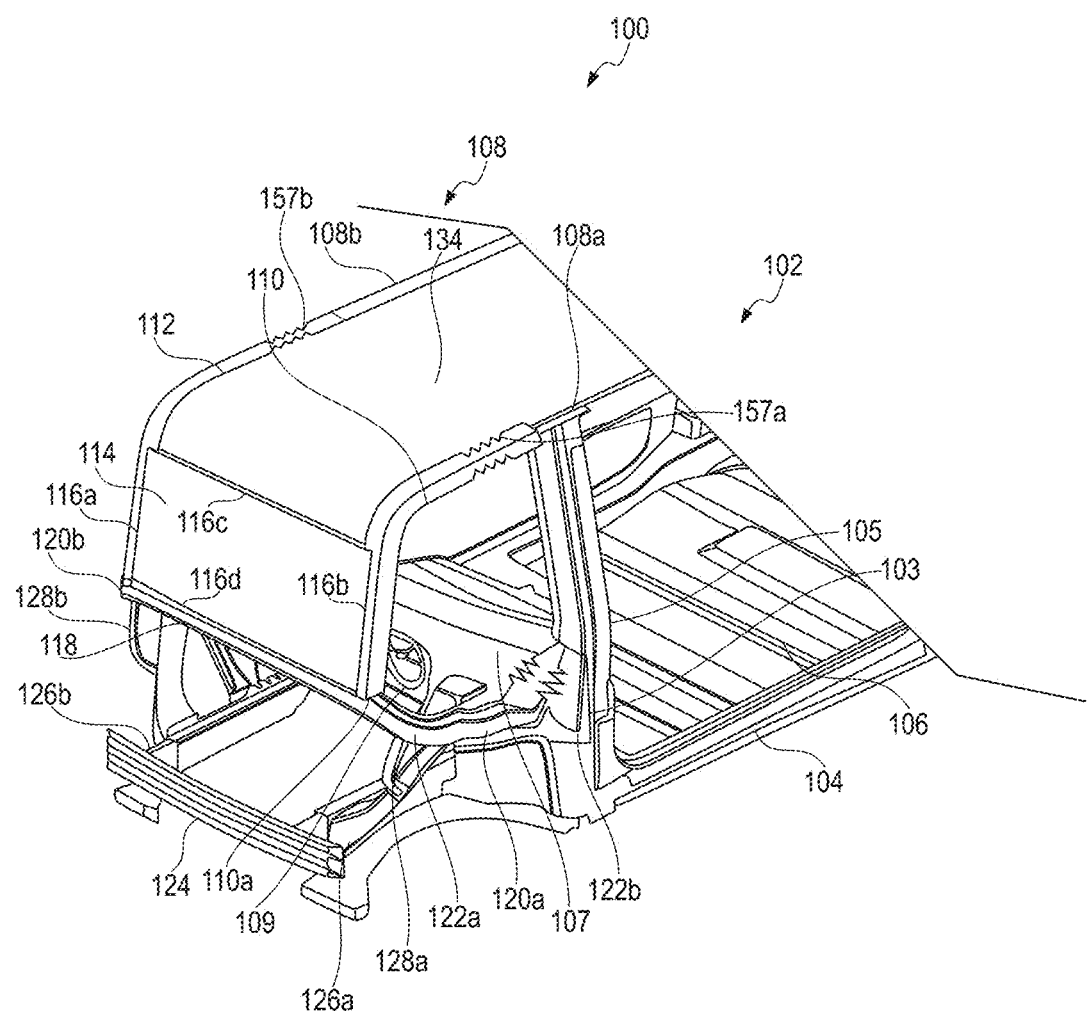
FIG. 1B is a front perspective view of the vehicle of FIG. 1A with crumpled zones illustrated.
Figure 1C:
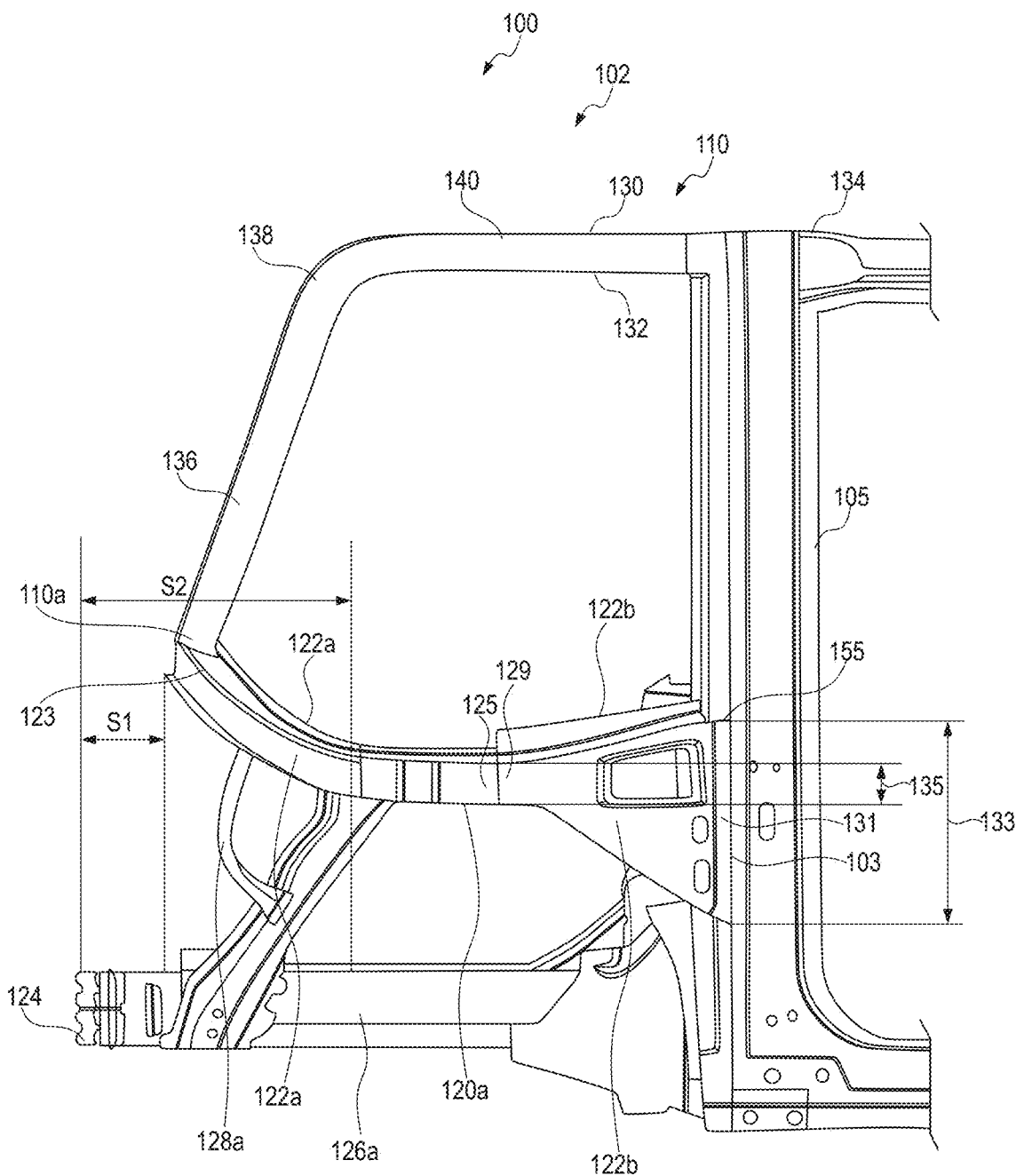
FIG. 1C is a side view of the vehicle of FIG. 1A.

FIGS. 1A and 1B are a front portion 102 of a vehicle 100. FIG. 1C is a side view of the front portion 102 of the vehicle 100. The vehicle 100 can be a mass transporter, such as a van or a bus, which includes a large passenger or cabin compartment 106 with a drivetrain and other components underneath a floor 104. As a result, the cabin compartment 106 abuts a driver's area and a distance between the cabin compartment 106 and a front bumper 124 is relatively small. The vehicle 100 includes a frame 108 that forms a body of the vehicle 100, such that the frame 108 and the floor 104 define the boundaries of the cabin compartment 106.

The vehicle 100 includes a first pillar 110 that extends from one end 108a of the frame 108 toward a windshield 114. A second pillar 112 extends from another end 108b of the frame 108 toward the windshield 114. The first pillar 110 and the second pillar 112 are the A-pillars of the vehicle 100. The first pillar 110 and the second pillar 112 are configured to deform, bend, or otherwise crumple in the event of a frontal crash. Details of how the first pillar 110 and the second pillar 112 deform are explained later with respect to FIGS. 2A and 2B.

The first pillar 110 and the second pillar 112 are spaced along a width of the frame 108 on each side of the windshield 114. The windshield 114 maybe a canopy style, where the windshield 114 is supported by the first and second pillars 110, 112 along a first side 116a and a second side 116b of the windshield 114. The windshield 114 includes a top portion 116c that is attached to a roof 134 which is supported by the frame 108. In addition, the windshield 114 includes a bottom portion 116d opposite to the top portion 116c. The vehicle 100 also includes a windshield retention beam 118 that supports the bottom portion 116d of the windshield 114. A manner by which the windshield retention beam 118 supports the bottom portion 116d is explained later with respect to FIG. 7.

The vehicle 100 includes a first side beam 120a, which is coupled to and positioned below the first pillar 110. The first side beam 120a extends from a windshield end 110a of the first pillar 110 at a joint 103 on a structural or B-pillar 105 of the frame 108. The first side beam 120a has a first or front portion 122a that is coupled to the first pillar 110 by the windshield. A second or rear portion 122b is coupled to the B-pillar 105. The first portion 122a has a first stiffness while the second portion 122b has a second stiffness, such that the second stiffness is less than the first stiffness. Additional details of the first side beam 120a and the difference in the first stiffness and the second stiffness are explained with respect to FIG. 1C. The vehicle 100 also includes a second side beam 120b (shown in FIG. 1A) that is coupled to the second pillar 112 and may have a similar structure to the first side beam 120a.

Referring now to FIG. 1C, the first side beam 120a is formed of the first portion 122a that has a front end 123 and a second end 125, such that the front end 123 is coupled to the windshield end 110a. The front end 123 and the windshield end 110a are attached, for instance, by welding or other fastener. In addition, the first side beam 120a includes the second portion 122b that has a first end 129 and a rear end 131. As shown in FIG. 1C, the second end 125 is integrally formed with the first end 129 while the rear end 131 is coupled to the B-pillar 105 at the joint or attachment location 103. The first side beam 120a is a single beam having these different portions of different dimensions, stiffness, and other properties to achieve a controlled crush.

The first end 123 of the first side beam is closer to the roof 134 than the second end 125 (the intersection of the second end 125 of the first portion 122a and the first end 129 of the second portion 122b). An upper edge 155 of the second portion 122b is closer to the roof 134 than the first end 129 of the second portion, such that the second portion has a curvature.

The rear end 131 is wider than the first end 129 of the second portion. In particular, the rear end 131 has a first dimension 133, which is in contact with the B-pillar 105. The rear end 131 may be welded to the B-pillar 105 to form the joint 103. The first end 129 has a second dimension 135, which is less than the first dimension 133.

Referring back to FIG. 1A, the first side beam 120a, the second side beam 120b, the first pillar 110, the second pillar 112, and the B-pillar 105 together define a driver's compartment 107 adjacent to the cabin compartment 106. The vehicle 100 also includes a steering wheel 109 inside the driver's compartment 107 proximate to the windshield 114 and the first side beam 120a. The first pillar 110, the B-pillar 105, and the first side beam 120a form an opening to support a window (not shown in FIG. 1A). Similarly, the second pillar 112, the second side beam 120b, and another B-pillar (not shown in FIG. 1A) form another opening to support a passenger side window (not shown in FIG. 1A).

The vehicle 100 also includes a cross member or front bumper 124 that is positioned below the windshield and the first and second pillars 110, 112. The cross member 124 is a component of the vehicle 100 on which a front fascia of the vehicle 100 can be mounted. Additionally, the vehicle 100 includes a pair of front rails 126a, 126b that attaches the cross member 124 to the frame 108. Each of the front rails 126a, 126b includes a coupling arm 128a, 128b, respectively, that couples the front rails 126a, 126b to the first pillar 110 and the second pillar 112. During a frontal crash, the received impact at the cross member 124 is transferred to the first pillar 110, the second pillar 112, the first side beam 120a, and the second side beam 120b via the front rails 126a, 126b. In the illustrated example, the vehicle 100 includes different provisions to mount a wheel. For instance, the front rails 126a, 126b, and the side beams 120a, 120b have attachment locations to allow mounting of a suspension assembly (not shown) on which a wheel hub assembly (not shown) and a wheel (not shown) can be mounted.

The first pillar 110 and the second pillar 112 are designed to crumple, as shown in FIG. 1B, such that the first pillar 110 and the second pillar 112 undergo a deformation or a controlled crush at locations 157a, 157b to absorb the impact of the frontal crash. These locations are associated with one embodiment of a controlled crush location. Each of the first and second pillars may include one or more of the controlled crush locations as beneficial to the vehicle design.

The first pillar 110 and the second pillar 112 may yield at these locations to absorb the impact to move the front end 123 of the second beam towards the B-pillar 105. The first side beam 122a may also have a controlled deform to collaboratively move the front end 123 and the bottom portion 116b of the windshield toward the B-pillar. For example, the second portion 122b may be configured to crumple in a controlled manner to further dissipate the energy from a crash. Alternatively, the first pillar 110 and the second pillar 112 can yield both at the bent portion and at the portion proximate to the frame 108. The controlled deformation is related to the first pillar 110 and the second pillar 112 having different stiffness zones.

Figure 2A:
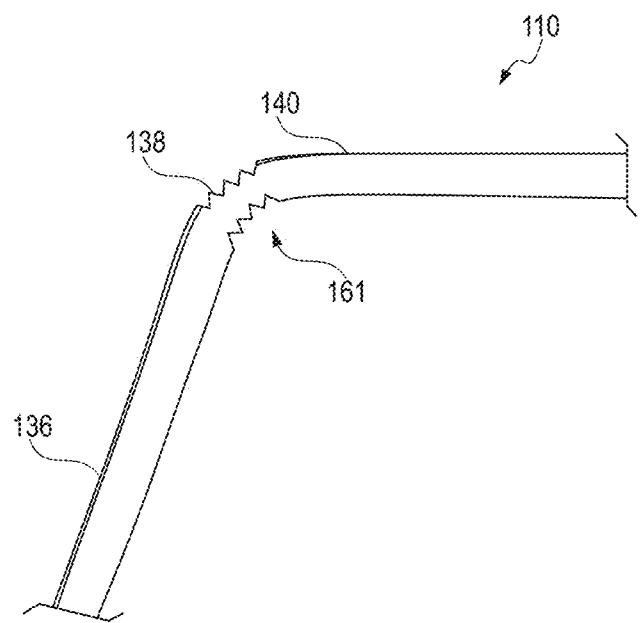
FIG. 2A is a side view of a pillar according to an embodiment of the present disclosure.

Structural details of the first pillar 110 are now explained with respect to FIGS. 2A through 3C in conjunction with FIG. 1C. FIG. 2A illustrates the first pillar 110 with deformation at a bent or crushed section 161, which is a different location than illustrated in FIG. 1C. FIG. 2B illustrates the first pillar 110 with deformation at a section 157a.

As shown in FIG. 1C, the first pillar 110 has a first wall 130 and a second wall 132 that extends along a complete length of the first pillar 110. The first wall 130 is adjacent to the roof 134 of the vehicle 100 while the second wall 132 is spaced from the roof 134 by the first wall 130. The first pillar 110 also includes a first portion 136 that is coupled to and extends from the first portion 122a of the first side beam 120a and runs along the windshield. In one example, the first portion 136 forms a first stiffness zone of the first pillar 110.

The first pillar 110 also includes a second portion 138 that extends from the first portion 136 and defines a bent portion of the first pillar 110. Further, the second portion 138 defines a second stiffness zone of the first pillar 110. In the illustrated example, the first stiffness zone has a first internal reinforcement and a second internal reinforcement, whereas the second stiffness zone has only the first reinforcement. Accordingly, the first stiffness zone has a greater stiffness than the stiffness of the second stiffness zone. The structural details that could be implemented to form the first reinforcement and the second reinforcement are explained with respect to FIGS. 3A-4. The difference in the stiffnesses allows the second portion 138 to deform in a controlled manner during the frontal crash.

Figure 2B:
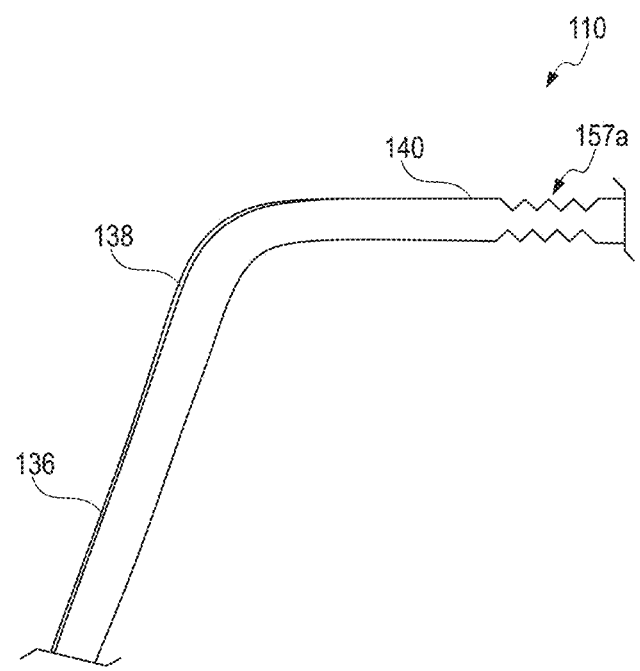
FIG. 2B is a side view of a pillar according to an embodiment of the present disclosure.

The first pillar 110 also includes a third portion 140 that extends from the second portion 138 to the frame 108. The third portion 140 is a substantially horizontal section of the first pillar 110 and has a third stiffness zone having a stiffness that can be different from the stiffness of the first stiffness zone and the second stiffness zone. The stiffness of the third stiffness zone may be less than the stiffness of the second stiffness zone. As a result, the third portion 140 may deform before the second portion 138 in the event of a frontal crash, as shown in FIG. 2B. Alternatively, the third portion may have the same stiffness as the first portion, including both of the internal reinforcements like the first portion of the beam.

As mentioned before, a difference in the stiffness of different portions of the first pillar 110 allows a controlled deformation of the first pillar 110 to absorb the impact. Since the first pillar 110 undergoes the controlled deformation, the impact of the frontal crash from reaching the cabin compartment 106 is mitigated.

Referring again to FIG. 1C, a distance S1 between the cross member 124 and the windshield retention beam 118 is relatively small in this style of vehicle. The different portions and different stiffness zones of the first pillar provide an increase in this dimension in the event of a crash. As the first pillar 110 deforms, a size of the front crumple zone increases from the distance S1 to a larger distance S2 that extends from the cross member 124 to a point where the first pillar 110 deforms. Providing the larger distance allowing absorption of impact to mitigate an impact to the frame 108.

Figure 3A:
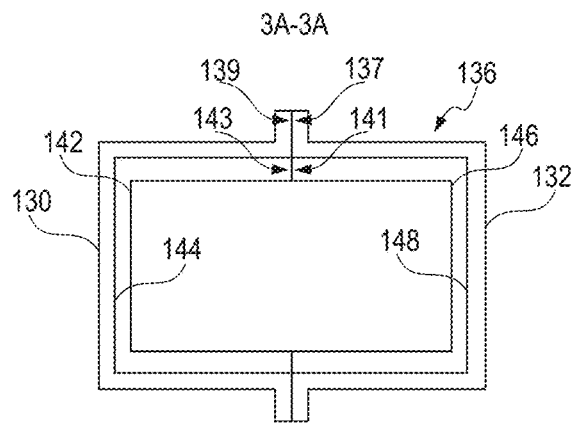
FIG. 3A is a cross-sectional view taken along line 3A-3A in FIG. 1A.
Figure 3B:
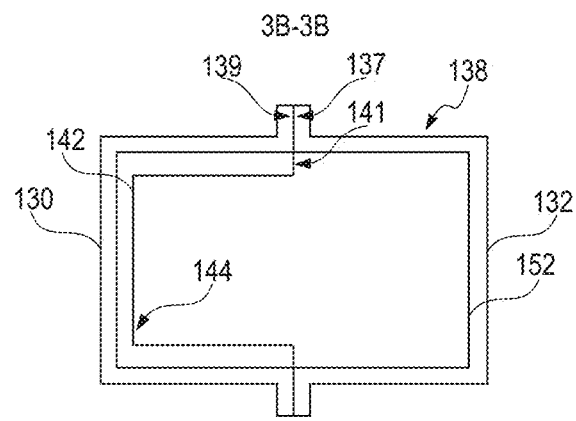
FIG. 3B is a cross-sectional view taken along line 3B-3B in FIG. 1A.
Figure 3C:
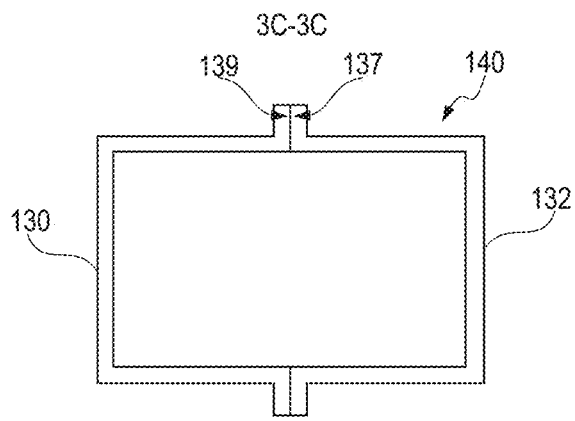
FIG. 3C is a cross-sectional view taken along line 3C-3C in FIG. 1A.

FIG. 3A is a cross-sectional view of the first portion 136 of the first pillar 110 taken along lines 3A-3A in FIG. 1A while FIG. 3B is a cross-sectional view of the second portion 138 taken along lines 3B-3B in FIG. 1A. FIG. 3C is a cross-sectional view of the third portion 140 taken along lines 3C-3C in FIG. 1A according to an embodiment. As shown in FIGS. 3A, 3B, and 3C, the first wall 130 and the second wall 132 are coupled together at an upper and lower location. The first wall 130 and the second wall 132 include a first surface 137 and a second surface 139 that are coupled to each other by welding or other fastening technique. Referring to FIG. 3A, the first portion 136 has a rectangular cross-section and includes a first interior support or first reinforcement 142 that is attached or otherwise coupled to a first inner surface 144 of the first wall 130. In addition, the first portion 136 includes a second interior support or second reinforcement 146 that is attached to a second inner surface 148 of the second wall 132. The first interior support 142 includes a first end surface 141 and the second interior support 146 includes a second end surface 143 that are coupled to each other. The first interior support 142 and the second interior support 146 are attached to the first inner wall 144 and the second inner wall 148, respectively, by different techniques, such as welding or stamping. The first interior support 142 and the second interior support 146, provide a first stiffness for the first portion 136.

FIG. 3B includes the second portion 138 having only the first interior support 142 attached to the first inner surface 144. The second interior support 146 is not included in this second portion 138, which creates a second stiffness in the first pillar 110. Further, the first end surface 141 in the second portion 138 is exposed. As a result, second stiffness of the second portion 138 is less than the first stiffness of the first portion 136.

FIG. 3C is the third portion 140 of the first pillar 110 which does not include either of the first and second internal supports. This creates a third stiffness in the first pillar 100. The third stiffness is less stiff than the second stiffness. The first pillar may have one or more of the different stiffness zones as the design of the end vehicle may benefit. In other embodiments, the first pillar may include only the first stiffness and the third stiffness.

Figure 4:
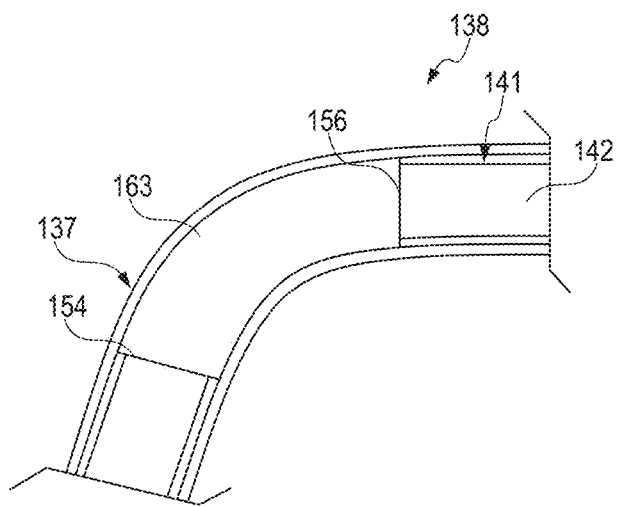
FIG. 4 is a cross-sectional view taken along line 4-4 in FIG. 1A.

FIG. 4 is a cross-sectional view of the second pillar 112 of FIG. 1A along line 4-4. This view shows an exterior wall 163 of the second pillar that does not include the second internal reinforcement. This embodiment could include the first internal reinforcement or may not include either reinforcement. The first interior support 142 inside the second portion 138 has a portion removed that exposes has a first end 154 that is spaced from a second end 156. The surface 141 is coupled to the other interior support as the surface 137 is coupled to the other wall of the pillar 112. The stiffness of the second portion 138 is lesser than the stiffness of the first portion 136. The third portion 140 does not include any interior support inside the third portion 140. Absence of the interior support in the third portion 140 results in lesser stiffness of the third portion 140 than the second portion 138. Therefore, during the impact, the third portion 140 deforms prior to the second portion 138, which results in the controlled deformation.

Figure 5:
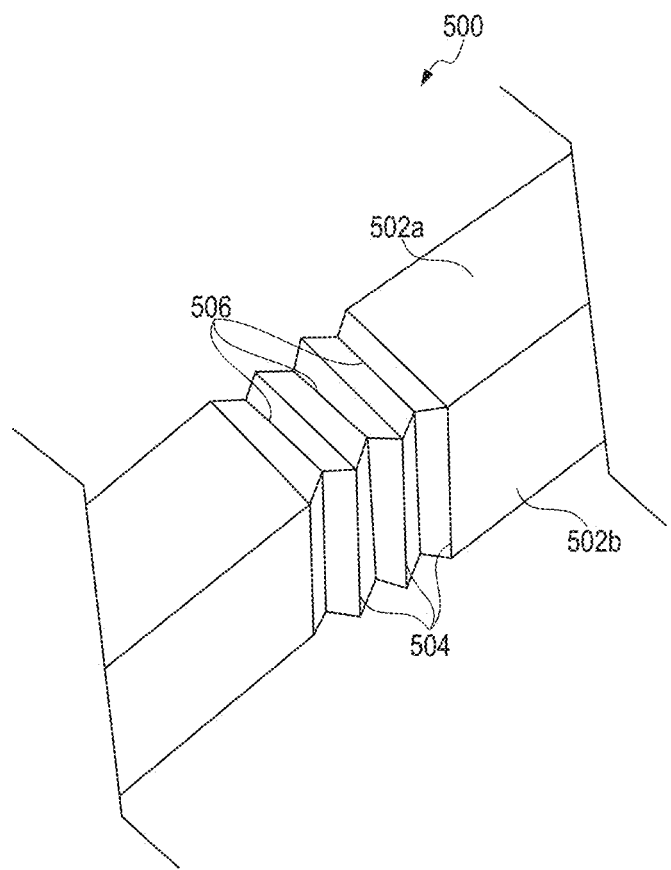
FIG. 5 is a perspective view of a portion of a pillar according to an embodiment of the present disclosure.

The second portion 138 can have a different profile or structural shape, in addition to the interior supports 144, 148, to achieve controlled deformation. FIG. 5 illustrates another portion 500 of a first or second pillar of the vehicle 100 with an accordion-shaped profile. A first wall 502a and a second wall 502b of the portion 500 has the accordion shape which is made up of a plurality of peaks 504 and valleys 506. As the pillar is a substantially rectangular cross-section, the other walls (not shown) will also include the plurality of peaks and valleys. Further, the peaks 504 and the valleys 506 are also present along the edges of the walls 502a, 502b. The walls 502a, 502b are configured to compress, such that gaps in-between peaks 504 are reduced. The impact may cause the portion 500 to bend, for instance, downwards towards the ground such that gaps in-between the peaks 504 present on the top side of the walls 502a, 502b increase while gaps in-between peaks 506 present on the bottom side of the walls 502a, 502b decrease.

Figure 6:
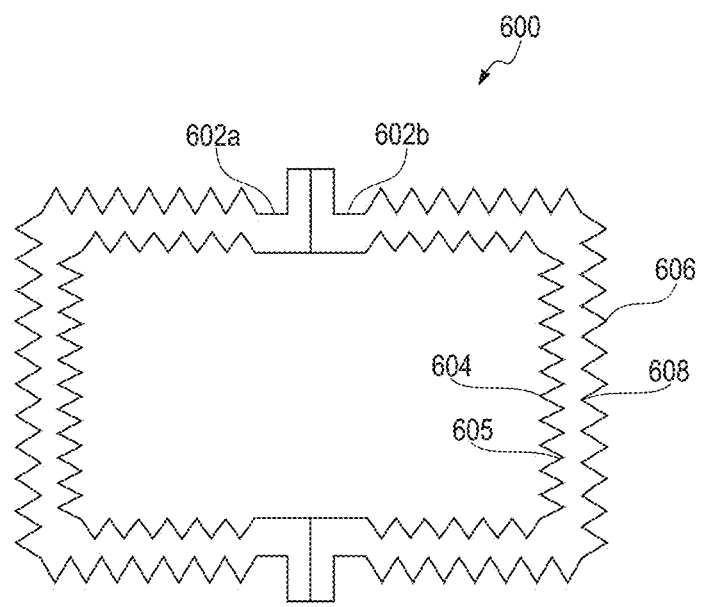
FIG. 6 is a cross-sectional view of an alternative embodiment of a portion of a pillar.

In addition to the accordion-shaped profile along the length of the second portion, the second portion can have an accordion-shaped internal features. FIG. 6 illustrates a cross-sectional view of another portion 600 of a first or second pillar the vehicle 100. The portion 600 has a first outer wall 602a and a second outer wall 602b that each include an exterior surface with a plurality of peaks 606 and valleys 608. Interior surfaces also include a plurality of peaks 604 and valleys 605. Gaps in-between peaks change to absorb an impact. Alternately, in case the impact causes the portion 600 to bend sideways, then gaps in-between the peaks 606 on a top and bottom part of the portion 600 would change. In either case, the change in the gap absorbs and mitigates the impact.

Figure 7:
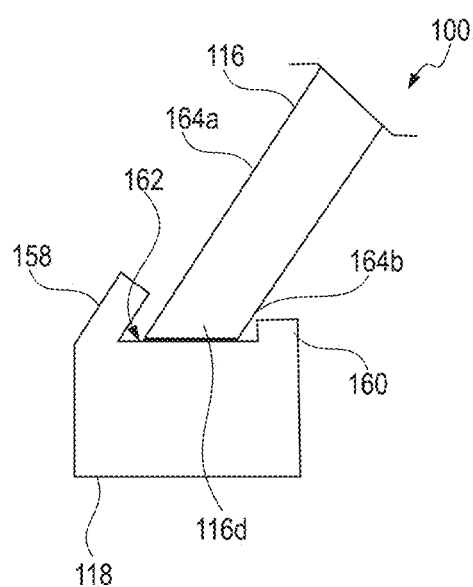
FIG. 7 is a cross-sectional view taken along lines 7-7 in FIG. 1A.

During a frontal crash, the windshield 114 is susceptible to damage and may dislodge from the first pillar 110 and the second pillar 112. In order to retain the windshield 114, the windshield retention beam 118 holds or otherwise restrains the windshield 114. FIG. 7 is a cross-sectional view of the windshield retention beam 118 taken along line 7-7 in FIG. 1A. The windshield retention beam 118 includes a first retention extension 158 and a second retention extension 160 that defines a surface 162 of the windshield retention beam 118. The bottom portion 116d of the windshield 114 is coupled or otherwise attached to this surface 162. The first retention extension 158 extends over a portion of the windshield 114 and overlaps an exterior side 164a of the windshield 114. Moreover, the first retention extension 158 extends transverse from the windshield retention beam 118. On the other hand, the second retention extension 160 extends over the windshield 114 and overlaps an interior side 164b of the windshield 114. The first retention extension extends further from the surface 162 than the second retention extension. Since the first retention extension 158 and the second retention extension 160 overlap the windshield 114, the windshield 114 is secured and can rotate with the deformation of the first and second pillars while retaining the end 166d with the windshield retention beam 118.

Figure 8:
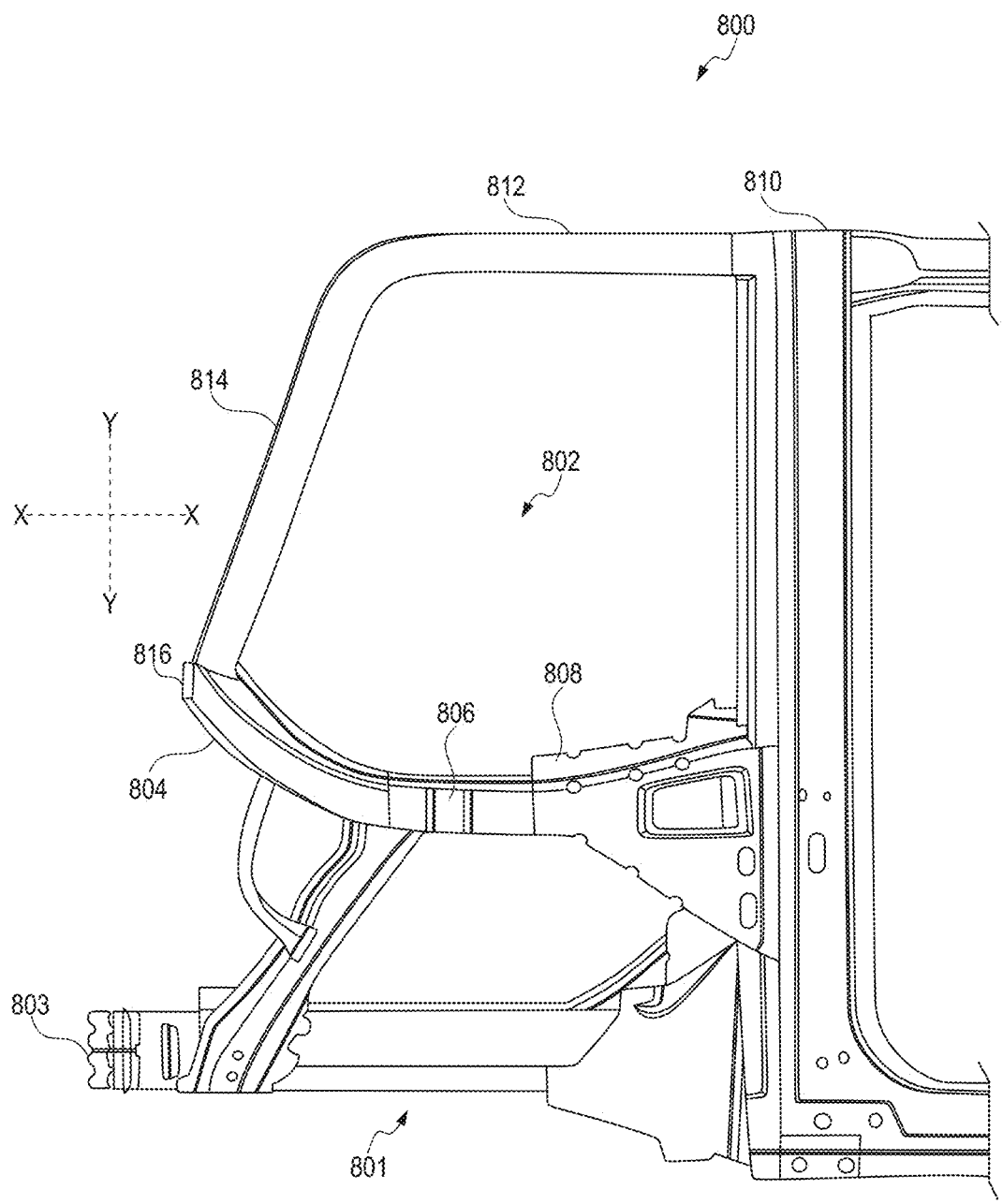
FIG. 8 is a side view of a vehicle, according to an embodiment of the present disclosure.
Figure 9:
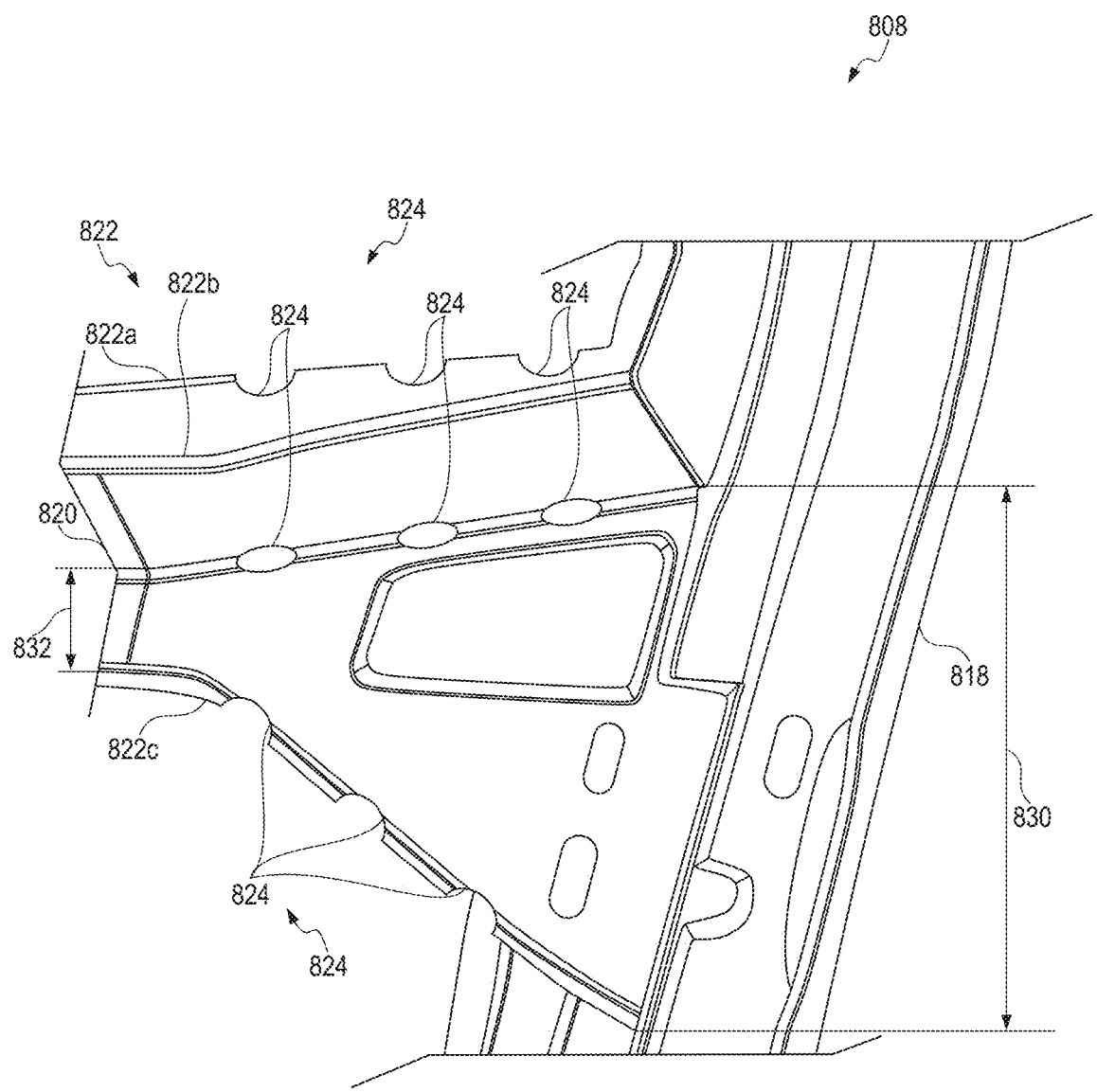
FIG. 9 is an enhanced view of a third portion of the first side beam of FIG. 8 having a plurality of holes.

According to the present disclosure, other components of the vehicle can also undergo controlled deformation to absorb the impact. FIG. 8 is a perspective view of another vehicle 800 that includes a frame 801. The frame 801 includes a first side beam 802 having a first portion 804, a second portion 806, and a third portion 808. FIG. 9 is an enhanced view of the third portion 808. Many of the frame components of the vehicle 800 are the same as that of the vehicle 100 shown in FIG. 1A. For instance, the vehicle 800 includes a body 810 that is structurally similar to the frame 108 of the vehicle 100. The vehicle 800 also includes a first pillar 812 and a second pillar (not shown), a canopy windshield 814, and a windshield retention beam 816. The vehicle 800 also includes a front bumper 803 that extend from the frame 801.

The first portion 804 of the first side beam 802 is coupled to the first pillar 812 while the third portion 808 is coupled to the body 810. The first portion 804 has a curvature along an X-axis (shown in FIG. 8) that extends between the windshield retention beam 816 and the second portion 806. The second portion 806 extends between the first portion 804 and the third portion 808, such that the second portion 806 can transfer the impact from the first portion 804 to the third portion 808. As with the first side beam in FIG. 1A, a location where the first side beam 802 couples to the windshield retention beam 816 is closer to a roof than an entirety of the third portion 808.

Referring now to FIG. 9, the third portion 808 has a first end 818 that is coupled to the body 810 and a second end 820 that is coupled to the second portion 806. Further, the first end 818 is attached the body 810, for instance, by welding. As shown in FIG. 9, the first end 818 has a width 830 from a top edge to a bottom edge and the second end 820 has a width 832 from a top edge to a bottom edge, such that the width 832 is smaller than the width 830.

The third portion 808 has a rectangular cross-section towards the second end 820. In addition, the third portion 808 has a taper shaped profile towards the first end 818. The third portion 808 includes a plurality of edges 822a, 822b, 822c, collectively referred to as edges 822. The edges 822 include a plurality of openings 824 that are present along a length of the edges 822 and at corners of bends of the third portion. The plurality of openings 824 allows the third portion 808 to deform in an impact mitigating the impact to the frame 801. These openings allow the third portion 808 to undergo the controlled deformation.

The various embodiments described above can be combined to provide further embodiments. Aspects of the embodiments can be modified, if necessary to employ concepts of the various patents, applications, and publications to provide yet further embodiments.

These and other changes can be made to the embodiments in light of the above-detailed description. In general, in the following claims, the terms used should not be construed to limit the claims to the specific embodiments disclosed in the specification and the claims but should be construed to include all possible embodiments along with the full scope of equivalents to which such claims are entitled. Accordingly, the claims are not limited by the disclosure.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:
1. A vehicle, comprising:
   a canopy windshield;
   a body;
   a windshield retention beam; and
   a first side beam that extends from the windshield retention beam to the body, the first side beam including:
      a first portion coupled to the windshield retention beam;
      a second portion; and
      a third portion coupled to the body, the second portion between the first portion and the third portion.

2. The vehicle of claim 1, wherein the third portion of the first side beam includes a first end coupled to the body and a second end coupled to the second portion, the second end being smaller in a first direction than the first end in the first direction.

3. The vehicle of claim 2, wherein the third portion includes a plurality of openings at edges of the third portion.

4. The vehicle of claim 2, wherein the first portion has a curvature from the windshield retention beam to the second portion, the first portion having a first end closer to an end of the canopy windshield than a second end in a first direction.

5. A vehicle, comprising:
   a windshield;
   a body;
   a windshield retention beam;
   a first pillar; and
   a first side beam that extends from the windshield retention beam to the body, the first side beam including:
      a first portion coupled to the windshield retention beam;
      a second portion; and
      a third portion coupled to the body, the second portion between the first portion and the third portion, wherein the third portion of the first side beam includes a first end coupled to the body and a second end coupled to the second portion, the second end being smaller in a first direction than the first end in the first direction.

6. The vehicle of claim 5, wherein the third portion includes a plurality of openings at edges of the third portion.

7. The vehicle of claim 5, wherein the first portion has a curvature from the windshield retention beam to the second portion, the first portion having a first end closer to an end of the windshield than a second end in a first direction.

* * * * *